(12) United States Patent
Besler et al.

(10) Patent No.: US 8,783,995 B2
(45) Date of Patent: Jul. 22, 2014

(54) COUPLER FOR PROMOTING LUBRICATION OF SHAFT SPLINES

(75) Inventors: Mark J. Besler, Dubuque, IA (US);
Jeffrey S. Turner, Coffeyville, KS (US);
Alfred S. Smemo, Dubuque, IA (US)

(73) Assignee: Deere & Company, Moline, IL (US)

( * ) Notice: Subject to any disclaimer, the term of this patent is extended or adjusted under 35 U.S.C. 154(b) by 216 days.

(21) Appl. No.: 13/034,949

(22) Filed: Feb. 25, 2011

(65) Prior Publication Data
US 2012/0219351 A1  Aug. 30, 2012

(51) Int. Cl.
*F16D 1/10* (2006.01)

(52) U.S. Cl.
CPC .......... *F16D 1/101* (2013.01); *F16D 2001/103* (2013.01); *F16D 2300/06* (2013.01)
USPC .......................... 403/305; 403/37; 403/359.1

(58) Field of Classification Search
CPC ..... F16D 1/02; F16D 1/101; F16D 2001/103; F16D 2300/06; E04C 5/165; E21B 17/046; B60K 7/0015; B60K 7/0007; B60K 2007/0038; B60K 2007/0092; B60Y 2306/03; B60Y 2200/41; B60Y 2200/414; B60Y 2200/415
USPC ................ 403/37, 39, 298, 305, 359.1, 359.6
See application file for complete search history.

(56) References Cited

U.S. PATENT DOCUMENTS

| | | | | |
|---|---|---|---|---|
| 1,469,304 A | * | 10/1923 | Hughes | 403/305 |
| 2,111,799 A | * | 3/1938 | Newpher | 174/7 |
| 2,510,414 A | * | 6/1950 | Philbrick | 464/154 |
| 2,699,656 A | * | 1/1955 | Anderson et al. | 464/88 |
| 3,117,430 A | * | 1/1964 | Mueller | 464/16 |
| 3,588,154 A | * | 6/1971 | Voight et al. | 403/300 |
| 3,871,786 A | * | 3/1975 | Rennerfelt | 403/300 |
| 3,889,489 A | * | 6/1975 | Casey et al. | 464/16 |
| 4,598,677 A | * | 7/1986 | Mongin et al. | 123/195 A |
| 4,961,669 A | | 10/1990 | Itoh et al. | |
| 6,283,869 B1 | * | 9/2001 | Spensberger | 464/153 |
| 6,321,646 B1 | * | 11/2001 | Daniel | 100/282 |
| 7,958,969 B2 | * | 6/2011 | Inoue et al. | 184/6.12 |
| 2001/0008590 A1 | | 7/2001 | Katada et al. | |
| 2009/0159370 A1 | * | 6/2009 | Maners et al. | 184/6.12 |
| 2009/0180828 A1 | * | 7/2009 | Weaver | 403/268 |

(Continued)

FOREIGN PATENT DOCUMENTS

| | | |
|---|---|---|
| GB | 2156483 | 10/1985 |
| JP | 2009257423 | 11/2009 |

OTHER PUBLICATIONS

German Search Report, Aug. 30, 2012.

*Primary Examiner* — Joshua Kennedy
(74) *Attorney, Agent, or Firm* — Taft Stettinius & Hollister, LLP; Stephen F. Rost (57) ABSTRACT

The present invention provides a coupling device for coupling an input shaft to an output shaft. The coupling device includes a housing having a first end and a second end. The coupling device further includes a first and second set of splines defined along the inner wall of the housing. The first set of splines is disposed near the first end and is configured for engaging splines of the input shaft. The second set of splines is disposed near the second end of the housing and is configured for engaging splines of the output shaft. The length of the first set of splines is substantially the same as the length of the second set of splines.

19 Claims, 5 Drawing Sheets

(56) References Cited

U.S. PATENT DOCUMENTS

| | | | |
|---|---|---|---|
| 2011/0129291 A1* | 6/2011 | Humes | 403/40 |
| 2012/0196715 A1* | 8/2012 | Turner et al. | 475/159 |
| 2012/0217079 A1* | 8/2012 | Besler et al. | 180/233 |

* cited by examiner

COUPLER FOR PROMOTING LUBRICATION OF SHAFT SPLINES

FIELD OF THE INVENTION

The present invention relates to an apparatus for coupling an input shaft to an output shaft, and in particular an apparatus that provides lubrication to splines of the input shaft and output shaft.

BACKGROUND OF THE INVENTION

In conventional powered vehicles, particularly those powered by an engine or motor, it is important to transfer torque from the powering device to the wheels of the vehicle. In many conventional instances, it is the transfer of torque from a diesel engine, for example, through a transmission and driveline to the wheels. In a different vehicle setup, torque can be transferred from a motor through a final drive to an independently powered wheel. The transfer of torque from the powering device to the wheels requires various couplings and connections therebetween to ensure the maximum amount of torque is transferred.

In some instances, the durability and life of these couplings and connections can be short. This requires time to service and replace these couplings and connections, thereby increasing the amount of downtime for a particular vehicle.

In addition, many components require appropriate lubrication during operation. Without adequate lubrication, components can overheat and fatigue more quickly. If a component fails, this can cause damage to other components and affect the overall performance of the vehicle. To provide sufficient lubrication to different components, a flow path must be designed to direct lube from its source to the desired components.

Figure 1:
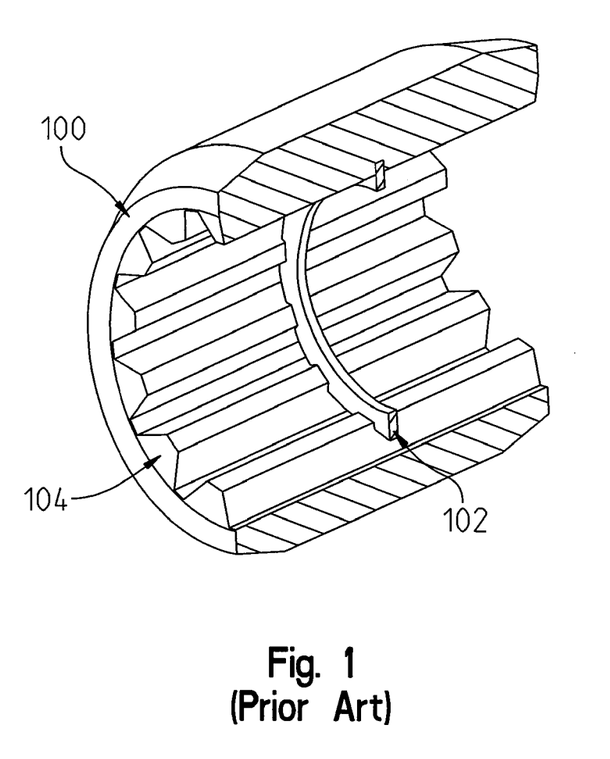
FIG. 1 is a partial perspective view of a conventional coupler.

In one conventional vehicle setup, an electric motor provides power to a drive assembly. Referring to FIG. 1, a conventional coupler 100 and snapring 102 are provided for connecting a motor output and drive assembly input to one another. The coupler 100 can facilitate the transfer of torque from the motor output to the vehicle's wheel(s). During vehicle operation, torsional vibrations from the motor can cause axial forces between the motor output and drive assembly input. In addition, the motor output and drive assembly input can slide along the splines 104 of the coupler and impose thrust loads against both faces of the snapring 102. In addition, the coupler 100 does not provide a lube path to adequately lubricate the motor input, drive assembly output, and the snapring 102. Thus, over a period of time, the snapring 102 can become damaged and eventually fail due to the axial forces, thrust loads, and heat generated during operation. When the snapring 102 fails, there is no structure or component available to hold the coupler 100 in place between the motor output and drive assembly input. Thus, the amount of torque transferred to the vehicle's wheel(s) can be substantially reduced and overall vehicle performance can be negatively affected. Further, other internal components can suffer damage due to the torsional vibrations and inadequate lubrication.

Therefore, a need exists for a coupling device that couples a powering device to a drive assembly to ensure torque is property transferred to a vehicle's wheel and further facilitates a flow path to provide lubrication to one or more desired components. A further need is for a coupling device to include a thrust surface to endure the axial loads from the powering device and have improved durability.

SUMMARY

In one exemplary embodiment of the present disclosure, a coupling device includes a housing having a first end and a second end. A first set of splines is defined along the inner wall of the housing and is disposed near the first end configured for engaging splines of the input shaft. A second set of splines is defined along the inner wall of the housing and is disposed near the second end for engaging splines of the output shaft. The length of the first set of splines is about the same as the length of the second set of splines. The coupling device can further include a shoulder protruding inwardly from the inner wall of the housing. The shoulder includes a first surface oriented towards the first end and a second surface oriented towards the second end. The first surface and second surface define thrust surfaces. In addition, the shoulder can be annular.

In one aspect of this embodiment, a central portion is defined in the housing between the first set of splines and second set of splines. The shoulder is disposed in the central portion. In another aspect, an orifice is defined in the housing near the central portion. Further, a first opening is defined in the housing near the first end and a second opening is defined in the housing near the second end. The lengths of the first and second sets of splines can be between 30-40 mm.

In another embodiment, a vehicle is provided having an independently powered wheel. The vehicle includes a powering device having an output shaft which has output splines. The vehicle also includes a drive assembly having an input shaft which has input splines. In addition, a coupler is provided for coupling the input shaft to the output shaft. The coupler includes a first set of splines and a second set of splines such that the first set of splines engage the output splines and the second set of splines engage the input splines. The length of the first set of splines is about the same as the length of the second set of splines.

In one aspect of this disclosure, the coupler comprises a housing having a first end and a second end such that the first end defining a first opening through which the output shaft extends and the second end defining a second opening through which the input shaft extends. The coupler can further include a shoulder protruding inwardly from an inner wall of the housing. The shoulder includes a first surface oriented towards the first end and a second surface oriented towards the second end. The vehicle can also have at least one orifice defined in the housing between the first set of splines and the second set of splines. In another aspect, there can be at least two orifices defined in the housing with one orifice being disposed between the shoulder and first set of splines and the other orifice being disposed between the shoulder and the second set of splines.

In a different aspect of this embodiment, the vehicle can include a quill that at least partially surrounds the coupler. In this aspect, the vehicle can include a flow path through which a lubricant can travel from a source to the input splines and output splines. The flow path can have a plurality of sections. For instance, a first section of the flow path is defined between the source and an input of the quill and a second section of the flow path is defined between the input and the internal chamber of the quill. A third section of the flow path is defined between the internal chamber of the quill and the at least one orifice of the housing. A fourth section of the flow path is defined between the at least one orifice of the housing and a central area defined in the housing between the first set of splines and second set of splines. A fifth section of the flow path is defined between the central area and the first and second ends of the housing. The first, second, third, fourth, and fifth sections of the flow path can be fluidly coupled to one another. In another aspect, the input splines have a first length and the output splines have a second length such that the lengths of the first set of splines and second set of splines are less than the first length and second length.

In a different embodiment of the present disclosure, a coupler is provided for coupling an output shaft of a motor to an input shaft of a final drive assembly. The coupler can include a housing having a first end and a second end, a first set of internal splines and a second set of splines defined along the inner wall of the housing. The first set of splines is disposed near the first end and is configured to engage the splines of the input shaft. The second set of splines is disposed near the second end for engaging the splines of the output shaft. The coupler further includes a shoulder extending radially inwardly from the inner wall of the housing. The shoulder has a first thrust surface oriented towards the first end and a second thrust surface oriented towards the second end. A central region is defined between the inner wall of the housing, the first set of internal splines, and the second set of internal splines.

In one aspect of this embodiment, the coupler includes a lube orifice defined in the housing and fluidly coupled to central region. Also, the shoulder can protrude into the central region of the housing. In another aspect, the length of the first set of internal splines is substantially the same as the length of the second set of internal splines.

One advantage of the present disclosure is the length of the first and second set of internal splines of the coupler having substantially the same length. In other words, the contact between the first set of splines to the splines of the input shaft is about the same as the contact between the second set of splines to the splines of the output shaft. As such, the axial forces produced by torsional vibrations in the motor, for example, are approximately the same for both the input shaft and output shaft and these forces cancel one another. In addition, the coupler may slide along the splines of the input shaft and output shaft, but the shoulder of the coupler includes thrust surfaces which are designed to withstand contact with the ends of each shaft. Unlike the example above with the snapring, the shoulder can absorb the contact and the axial forces subjected thereto and can last longer than the snapring.

Another advantage is the flow path defined in the coupler. Lube, for example, can travel along the flow path and enter the central region of the coupler through the defined orifice(s). As the lube enters the central region, it is retained by the housing walls and as the oil fills the volume of the central region it is forced along the splines of the input and output shafts. The oil can then exit the coupler through the first and second ends of thereof and return to the lube reservoir or sump. The coupler therefore provides sufficient lubrication to the splines of the input and output shafts.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In its broadest sense, the present disclosure relates to a means for coupling an output shaft of a power-generating device and an input shaft of a drive assembly. In this disclosure, the power-generating device can be any apparatus or mechanism for producing torque. This can include an engine, motor, battery, or any other known device. The drive assembly can be a type of transmission, for example, or combination of a transmission and driveline. The drive assembly can transfer torque from the power-generating device to one or more wheels of a vehicle. The drive assembly, or final drive assembly, can include gears, clutch assemblies, shafts, housings, etc. to enable a vehicle to shift or change gear ratios, modes, ranges, etc.

Figure 2:
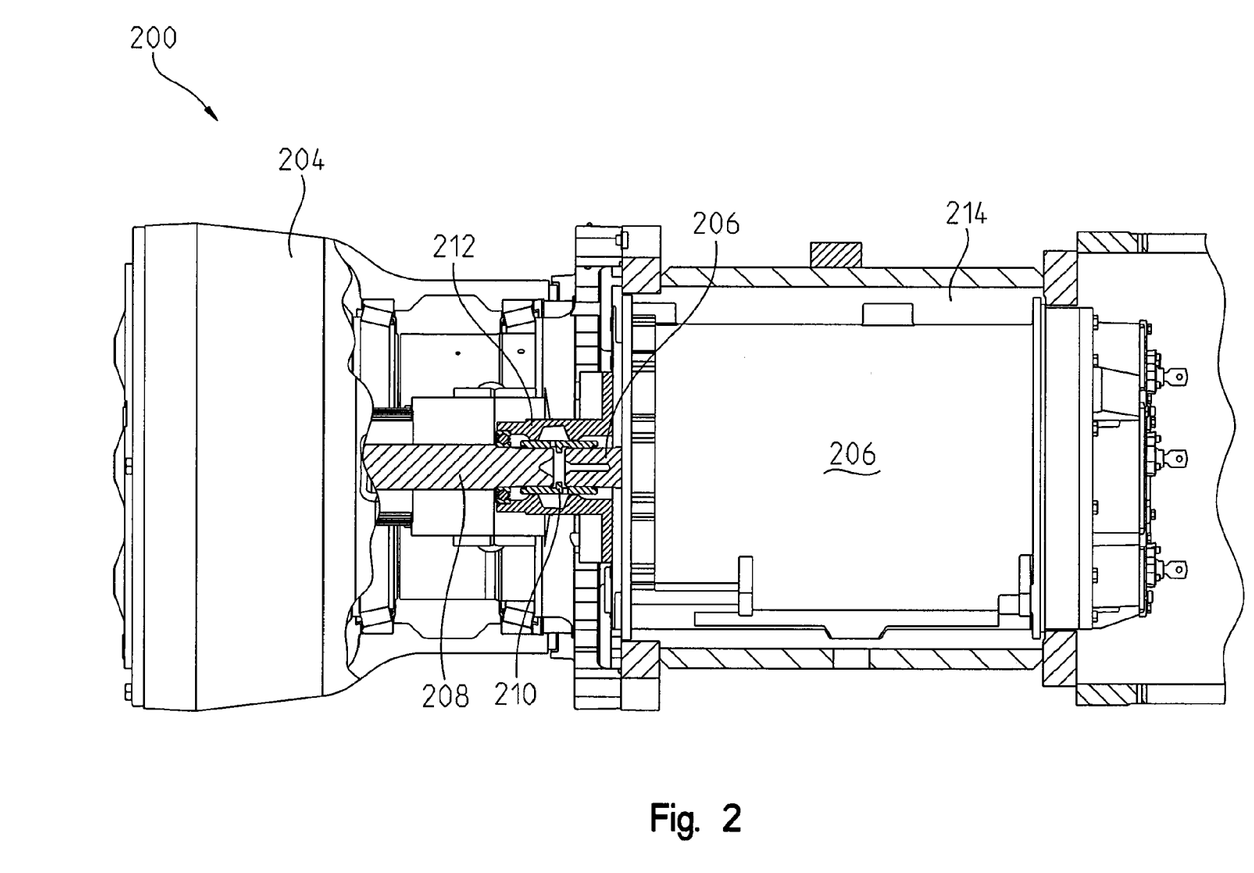
FIG. 2 is a partial side view of an axle for a vehicle having an independently powered wheel.

Referring to the embodiment shown in FIG. 2, an axle assembly 200 for a vehicle having independently-powered wheels is provided. The vehicle can include one or more axles and a plurality of wheels. In FIG. 2, for example, the assembly 200 can include a motor 202 and final drive assembly 204 that provide torque to an independent wheel. This wheel can be part of a front or rear wheel for a front loader, a dump truck, a motor grader, a skidder, etc. The motor 202 can be an electric or hydraulic motor. In one aspect, the motor 202 can be any known switch reluctance motor.

As shown, the final drive assembly 204 includes an input shaft 208 and the motor 202 includes an output shaft 206. The diameter of the shafts is about the same so that torque can be equivalently transferred from the output shaft 206 to the input shaft 208. To achieve this transfer, a coupler 210 couples the output shaft 206 and input shaft 208 to one another. As described below, the coupler 210 can include splines to engage corresponding splines of the input and output shafts. The coupler 210 is at least partially surrounded by a quill 212. The quill can enclose or house a set of springs (not shown) of a parking brake (not shown) in the final drive assembly 204. The quill 212 can also support a thrust bearing which further supports the input shaft 208 of the final drive assembly 204.

The coupler 210 can be made of carbon steel, for example, and further hardened by a carburizing process. In a non-limiting embodiment, the outer diameter of the coupler can be between 80-100 mm and the inner diameter between 50-75 mm. The coupler 210 can have a length of between 100-130 mm. These dimensions are not absolute and the coupler 210 can have different dimensions for different applications.

Figure 3:
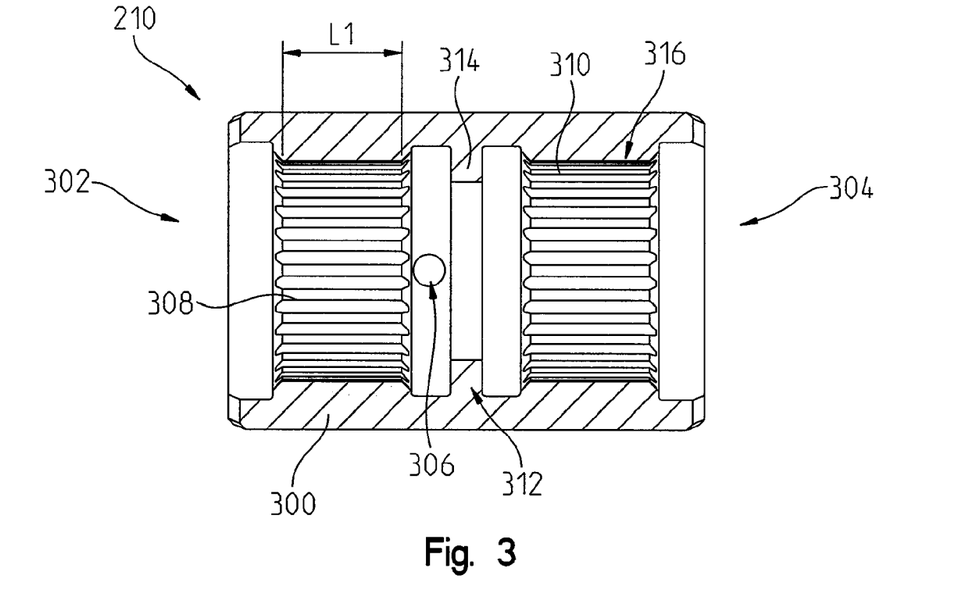
FIG. 3 is a partial side view of a coupler.
Figure 4:
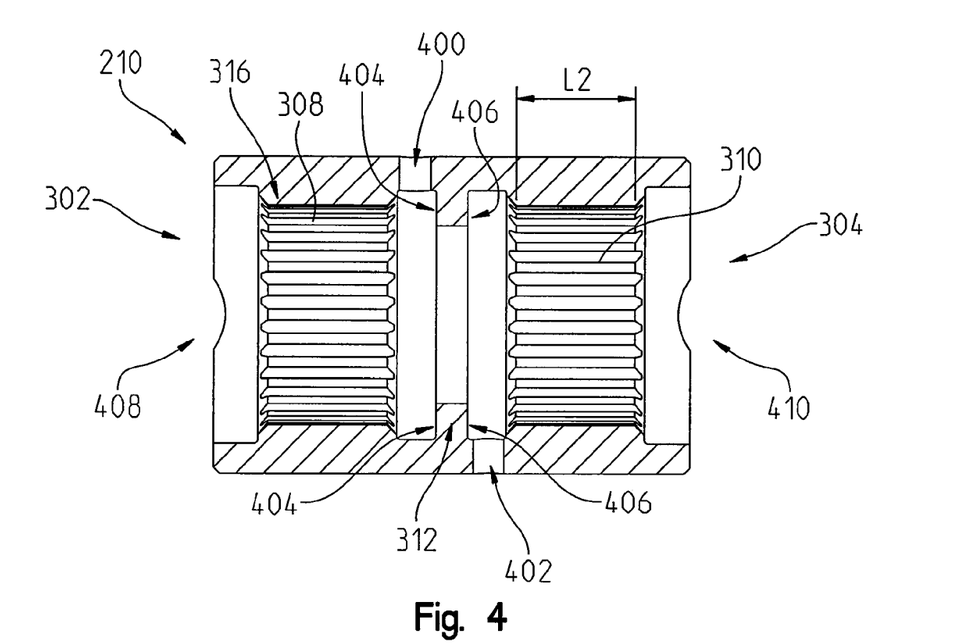
FIG. 4 is a partial top view of the coupler of FIG. 3.

The coupler 210 is advantageously designed such that it can be interchangeably coupled to either the output shaft 206 or input shaft 208. To further illustrate this interchangeability, the coupler 210 is shown in FIGS. 3 and 4. In FIG. 3, the coupler 210 can include an outer housing 300 or shell. The housing 300 can be annular, for example, or have any desired shape. The housing 300 can be substantially hollow and have a first end 302 and second end 304. The first end 302 of the housing 300 can define a first opening 408 through which the input shaft 208 can be assembled and the second end 304 can define a second opening 410 through which the output shaft 206 can be assembled.

The housing 300 can be divided into several portions or sections. For example, a first portion of the housing 300 can include a first set of internal splines 308. The first set of splines 308 are disposed near the first end 302 of the housing 300 and can engage corresponding splines 504 (see FIG. 5) on the input shaft 208. The first set of splines 308 has a length L1. Similarly, the housing 300 can also include a second portion that comprises a second set of splines 310. The second set of splines 310, which are disposed nearest the second end 304 of the housing 300, have a length L2. The second set of splines 310 are configured to engage corresponding splines 502 (FIG. 5) on the output shaft 206.

In at least one aspect, lengths L1 and L2 are substantially the same. For instance, L1 and L2 can be between 25-45 mm. In another instance, L1 and L2 can be between 30-40 mm. In a further instance, lengths L1 and L2 can be approximately 35 mm. The contact or engagement of the first set of splines 308 to the input shaft 208 and the engagement of the second set of splines 310 to the output shaft 206 are nearly identical because the lengths L1 and L2 are about the same. Thus, the contact between the coupler 210 and the output shaft 206 is approximately the same as the contact between the coupler 210 and the input shaft 208. Since there is nearly equal spline length (represented by 316), axial forces produced during vehicle operation cancel out and therefore wear and/or damage to the shafts and coupler 210 is substantially reduced.

The coupler 210 can further include a lube orifice 306 defined in the housing 300. The orifice 306 can be approximately 12 mm in diameter and allows oil or another lubricant to enter the coupler 210. The orifice 306 can further comprise a first orifice 400 and a second orifice 402. In other embodiments, there can be additional lube orifices 306 to permit additional lube to collect inside the coupler 210. The orifice 306 is defined near a central portion or region 312 of the housing 300. The central region 312 is defined between the first set of splines 308 (i.e., first portion) and the second set of splines 310 (i.e., second portion). Oil or another lubricant can therefore enter the coupler 210 through the one or more orifices 306 and collect in the central region 312. The flow of lube is further shown in FIG. 6 and will be described below.

In FIGS. 3 and 4, the coupler 210 also includes a shoulder 314 or projection that protrudes inwardly from an inner wall of the housing 300. The shoulder 314 can be annular, for example, such that it protrudes radially inward. As shown, the shoulder 314 protrudes into the central region 312 of the housing 300. The shoulder 314 includes a first thrust surface 404 and a second thrust surface 406. In one non-limiting embodiment, the shoulder 314 thickness defined between the first thrust surface 404 and second thrust surface 406 can be between 6-12 mm. In other embodiments, the shoulder 314 can be thicker or thinner.

The first thrust surface 404 is oriented towards the first end 302 of the housing 300 and the second thrust surface 406 is oriented towards the second end 304 of the housing 300. As will be more apparent in FIG. 5, the coupler 210 can slide axially along the splines of the input shaft 208 and output shaft 206. Thus, as the coupler 210 moves towards the input shaft 208, the face of the shaft 208 can contact the first thrust surface 404 of the shoulder 314. Likewise, as the coupler moves towards the output shaft 206, the face of the shaft 206 can contact the second thrust surface 406 of the shoulder 314.

The shoulder 314, and in particular the first thrust surface 404 and second thrust surface 406, is carburized to endure the contact with either shaft. As such, the shoulder 314 provides durability advantages over the conventional snapring 102 described above.

Figure 5:
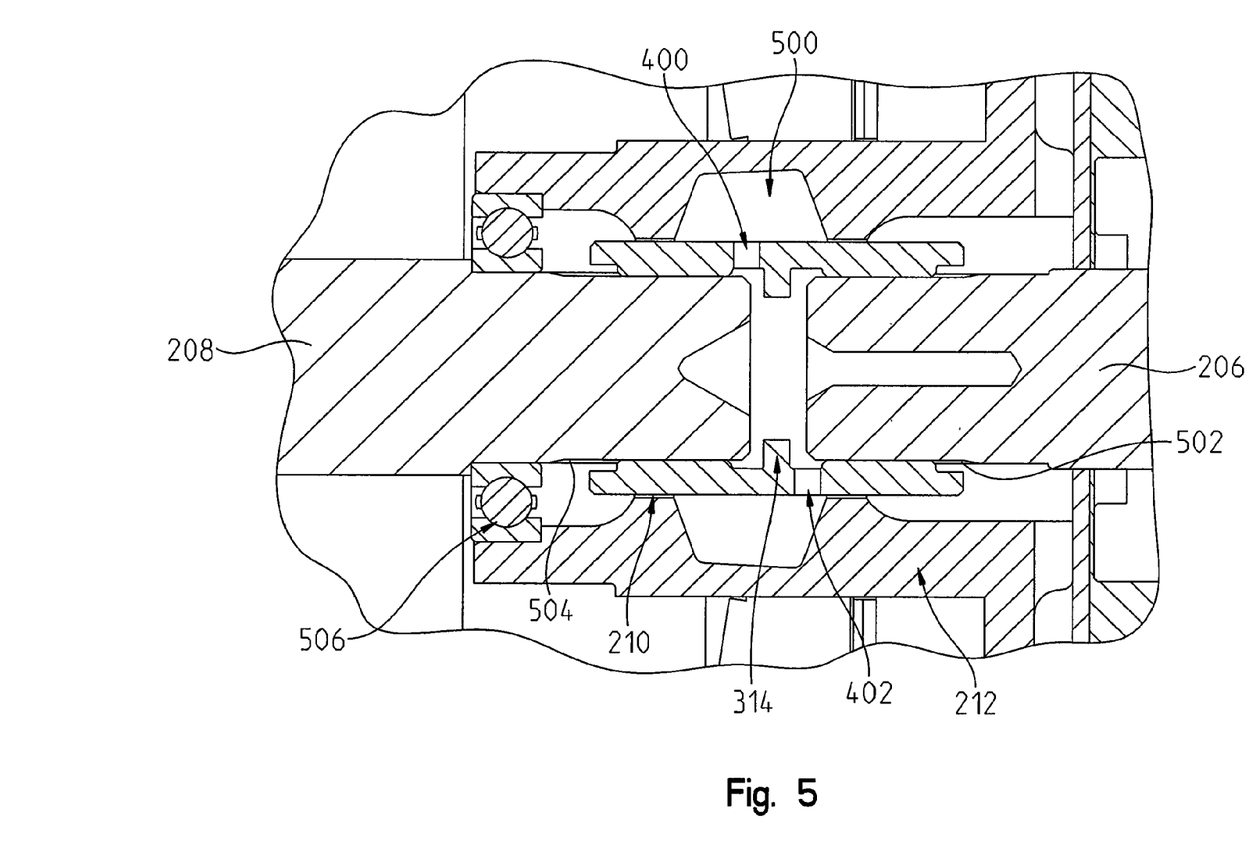
FIG. 5 is a partial top view of a coupler coupling a pair of shafts.

It is also important to note that even though the coupler 210 can slide axially, the first set of internal splines 308 remain engaged with the splines 504 of the input shaft 208 and the second set of internal splines 310 remain engaged with the splines 502 of the output shaft 206. More particularly, the entire length L1 of the first set of splines 308 remains engaged with the splines 504 of the input shaft 208 and the entire length L2 of the second set of splines 310 remains engaged with the splines 502 of the output shaft 206. Therefore, the axial forces cancel each other regardless of how far or in what direction the coupler 210 moves.

As shown in FIG. 4, the first end 302 of the housing 300 can define a first opening 408 and the second end 304 can define a second opening 410. During operation, the lubricant that enters the coupler 210 can exit therefrom by passing through the first opening 408 and/or second opening 410.

In the embodiment shown of FIG. 5, the coupler 210 is shown at least partially surrounded by the quill 212. The output shaft 206 of the motor 202 and the input shaft 208 of the drive assembly 204 are coupled to the coupler 210. The output shaft 206 has splines 502 that can engage the second set of internal splines 310 of the coupler 210. Likewise, the input shaft 208 has input splines 504 that can engage the first set of internal splines 308 of the coupler 210. The input shaft 208 and output shaft 206 can also have bearings, thrust washers, snaprings, o-rings, and other like components that support the respective shaft. In FIG. 5, for example, the input shaft 208 can be supported by a ball bearing 506.

The quill 212 can include an internal chamber 500 that is in fluid communication with the first lube orifice 400 and second lube orifice 402. The quill 212 defines a portion of a lube path that is fluidly coupled to the central region or portion 312 of the coupler 210. This can be further seen in the embodiment of FIG. 6.

Figure 6:
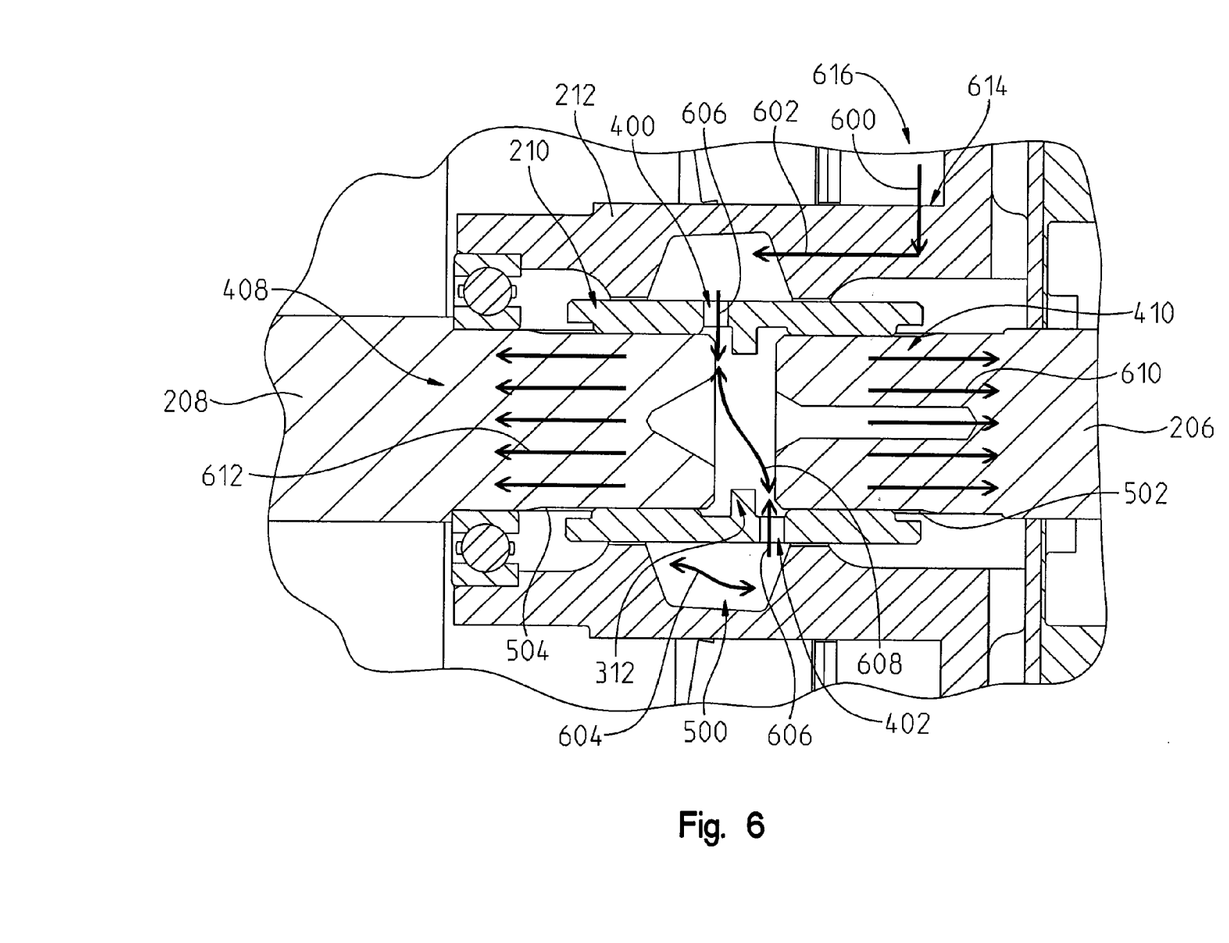
FIG. 6 is a partial top view of a coupler defining a flow path.

With reference to FIG. 6, an exemplary lube flow path is illustrated. Oil or another lubricant can be used. A source 616 of lube can be provided, for example, in a reservoir or sump defined in the axle tube 214 (see FIG. 2). There can be additional reservoirs that supply lube to the source 616. The flow path is shown in FIG. 6 by a series of arrows to illustrate how the lubricant can enter and pass through the coupler 210.

As described above, the lube is supplied by the source 616 and travels along a first path defined by arrow 600. Along this first path 600, the lube enters the quill 212 through an input orifice or slot 614 defined in the quill. As the lube enters the quill 212, it travels along a second path defined by arrow 602. As the lube travels along the second path 602, it enters the quill chamber 500 and collects therein (represented by arrow 604). The first path 600 and second path 602 are fluidly coupled to one another.

As the lube collects in the quill chamber 500, it eventually enters the coupler 210 by travelling along a third path defined by arrow 606. To do so, the lube passes through the first lube orifice 400 and second lube orifice 402 and enter the central region or portion 312 of the coupler 210. As the lube enters the coupler 210, it collects and fills the central region 312. The collection of lube in the central region 312 represents a fourth path defined by arrow 608.

Once the volume of the central region 312 of the coupler 210 is substantially occupied by the lube, the lube is forced to exit the coupler 210. To exit the coupler 210, however, the lube must travel along the splines of the input and output shafts. The flow path therefore includes a fifth path defined by arrows 610 as lube is forced to travel along the output splines 502 of the output shaft 206. The flow path further includes a sixth path defined by arrows 612 as lube is forced to travel along the input splines 504 of the input shaft 208. A sufficient amount of lube is thus provided to the splines of both the input and output shafts for desired cooling and lubricating. As shown by arrows 610 and 612, lube can exit the coupler 210 through the first opening 408 and second opening 410 defined therein.

In a different embodiment, lube can be available at each end of the coupler 210 and enter through the first opening 408 and/or second opening 410 (see FIG. 4). In this embodiment, the lube can be exhausted through the first orifice 400 and second orifice 402 into a surrounding chamber (absent the quill 500). In other words, the output splines 502 and input splines 504 can be pressure-lubed with flow paths similar to those shown in FIG. 6 (albeit with arrows 606, 608, 610, and 612 pointing in opposite directions). Alternatively, the output splines 502 and input splines 504 can function similar to a centrifugal pump by drawing lube in through the first opening 408 and second opening 410 defined in the coupler 210 and exhausting the lube into a larger cavity or chamber.

The coupler 210 provides multiple advantages over the prior art and one such advantage is the ability to retain the lube as it fills the volume of the central region 312. As shown in FIG. 6, the coupler 210 provides no exit therefrom except through the first opening 408 and the second opening 410. As noted, however, the lube cannot exit the coupler 210 without adequately lubricating the splines on the input and output shafts. In addition, the lube is not directly dispersed on the splines of either the input or output shafts. Instead, the first lube orifice 400 and second lube orifice 402 are defined in the housing 300 such that lube enters the central region 312 of the coupler 210 between the two shafts. Therefore, as the volume of the central region 312 fills with lube, the lube is forced to travel along the splines of the input and output shafts.

Although the illustrated embodiments only show two lube orifices, there is no requirement for how many lube orifices are defined in the housing 300 of the coupler 210. However, there are advantages related to the location of these orifices so that lube fills the central region 312 of the coupler 210 before being dispersed or forced to travel along the splines of the input and output shafts. It can also be advantageous to minimize the size of the orifices to prevent backflow of lube. In other words, there are advantages when the lube exits the coupler 210 through the first opening 408 and second opening 410 defined at each end of the coupler 210.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A coupling device for coupling an input shaft to an output shaft, comprising:
a housing having a first end and a second end, the first end being longitudinally spaced from the second end;
a first set of splines defined along an inner wall of the housing, the first set of splines disposed near the first end configured for engaging splines of the input shaft;
a second set of splines defined along the inner wall of the housing, the second set of splines disposed near the second end for engaging splines of the output shaft;
a first outlet defined in the housing near the first end and a second outlet defined in the housing near the second end;
a central region defined within the housing between the first set of splines and the second set of splines, the central region including a first inlet defined in the inner wall between the shoulder and the first set of splines through which fluid can be received therein; and
a portion of the inner wall protruding inwardly into the central region, the portion forming a shoulder configured to force fluid to flow around the shoulder and through the central region to the first and second sets of splines;
wherein, the length of the first set of splines is substantially the same as the length of the second set of splines;
further wherein, the first set of splines is longitudinally spaced from the second set of splines such that the central region is defined therebetween, and the first set of splines form at least part of the first outlet and the second set of splines form at least part of the second outlet wherein the first inlet, central region, first outlet and second outlet are fluidly coupled to one another.

2. The coupling device of claim 1, wherein the shoulder includes a first surface oriented towards the first end and a second surface oriented towards the second end.

3. The coupling device of claim 1, wherein the shoulder is annular.

4. The coupling device of claim 1, wherein the shoulder is disposed in the central region and longitudinally spaced from both the first set of splines and the second set of splines.

5. The coupling device of claim 4, further comprising:
a first portion having a first diameter and being defined between the first end and the central region; and
a second portion having a second diameter and being defined between the second end and the central region;
wherein, the first diameter and second diameter are about the same.

6. The coupling device of claim 4, further comprising a second inlet defined in the housing near the central region, the second inlet being axially and radially spaced from the first inlet;
wherein, the first inlet, the second inlet, the central region, the first outlet, and second outlet are configured to be fluidly coupled to one another with fluid that enters the central region via the first inlet and the second inlet.

7. The coupling device of claim 1, wherein the central region comprises a defined volume, the defined volume configured to be substantially filled with fluid before either the first set of splines or second set of splines receives fluid.

8. The coupler of claim 1, further comprising a second inlet defined in the inner wall of the housing, the first inlet and second inlet being longitudinally spaced from one another wherein the first inlet is defined between the shoulder and the first outlet and the second inlet is defined between the shoulder and the second outlet.

9. A vehicle having an independently powered wheel, comprising:
a powering device having an output shaft, the output shaft including output splines;
a drive assembly having an input shaft, the input shaft including input splines;
a coupler for coupling the input shaft to the output shaft, the coupler including a housing having a first end longitudinally spaced from a second end, the first end defining a first outlet and the second end defining a second outlet;

a first set of splines and a second set of splines longitudinally spaced from one another and defined along an inner wall of the housing, the first set of splines disposed at the first end of the housing for engaging the input splines and the second set of splines disposed at the second end of the housing for engaging the output splines;

a shoulder disposed radially inward from the inner wall of the housing and longitudinally spaced between the first set of splines and the second set of splines, the shoulder forming a first thrust surface oriented substantially perpendicularly to the first outlet and a second thrust surface oriented substantially perpendicularly to the second outlet; and at least one inlet defined in the inner wall of the housing between the shoulder and one of the first set of splines and the second set of splines, the inlet adapted to receive fluid from a fluid source outside the housing;

wherein the length of the first set of splines is substantially the same as the length of the second set of splines;

further wherein, the first outlet is defined between the engagement of the first set of splines and the input splines and the second outlet is defined between the engagement of the second set of splines and the output splines wherein the at least one inlet, first outlet and second outlet are fluidly coupled to one another.

10. The vehicle of claim 9, further comprising at least two inlets defined in the housing, one inlet being disposed between the shoulder and first set of splines and the other inlet being disposed between the shoulder and the second set of splines.

11. The vehicle of claim 9, further comprising a quill, the quill defining an internal chamber in which the coupler is disposed.

12. The vehicle of claim 11, further comprising a flow path through which a fluid can flow from a source to the input splines and output splines, the flow path having a plurality of sections;

wherein,
a first section of the flow path defined between the source and an input of the quill;

a second section of the flow path defined between the input and the internal chamber of the quill, the first section and second section being fluidly coupled to one another;

a third section of the flow path defined between the internal chamber and an inlet defined in the housing between the first set of splines and the second set of splines, the second section and third section being fluidly coupled to one another;

a fourth section of the flow path defined between the inlet and a central area defined in the housing between the first set of splines and second set of splines, the third section and fourth section being fluidly coupled to one another; and a fifth section of the flow path defined between the central area and the first and second ends of the housing, wherein, the fourth section comprises a defined volume that is substantially filled with fluid before fluid enters the fifth section.

13. The vehicle of claim 9, wherein the coupler is movable axially between a first position and a second position, where in the first position the first thrust surface is in contact with the input shaft and in the second position the second thrust surface is in contact with the output shaft.

14. The vehicle of claim 13, wherein the first set of splines remains engaged with the input splines and the second set of splines remains engaged with the output splines when the coupler is in the first position, second position, or any position therebetween.

15. The vehicle of claim 9, wherein:
the first outlet is defined between the housing and input splines; and
the second outlet is defined between the housing and the output splines.

16. The vehicle of claim 9, wherein the at least one inlet comprises a plurality of inlets defined in the housing;
wherein, the plurality of inlets, the first set of splines, the second set of splines, the first outlet, and second outlet are fluidly coupled to one another.

17. A coupler for coupling an input shaft to an output shaft, comprising:
a housing having a first end and a second end longitudinally spaced from one another;
a first set of splines defined along an inner wall of the housing, the first set of splines disposed near the first end for engaging with splines of the input shaft;
a second set of splines defined along the inner wall of the housing, the second set of splines disposed near the second end for engaging splines of the output shaft, the second set of splines and first set of splines being longitudinally spaced from one another;
a shoulder extending radially inwardly from the inner wall of the housing and longitudinally spaced between the first set of splines and the second set of splines, the shoulder having a first thrust surface oriented towards the first end and a second thrust surface oriented towards the second end;
a central region having a volume defined between the inner wall of the housing, the central region further formed in the longitudinal space between the first set of splines and the second set of splines; and
a first inlet defined in the inner wall of the housing between the shoulder and the first set of splines and a second inlet defined in the inner wall of the housing between the shoulder and the second set of splines, the first inlet and the second inlet being fluidly coupled to the central region, the first set of splines, and the second set of splines;
wherein, the first inlet and the second inlet are spaced longitudinally from one another.

18. The coupler of claim 17, wherein the shoulder protrudes into the central region.

19. The coupler of claim 17, wherein the length of the first set of splines is substantially the same as the length of the second set of splines.

* * * * *